United States Patent [19]

Takemae et al.

[11] Patent Number: 5,343,263
[45] Date of Patent: Aug. 30, 1994

[54] LENS GRIP COUPLING AND POSITIONING MECHANISM

[75] Inventors: Hisao Takemae; Tadamasa Manome; Keiji Kaneko, all of Omiya, Japan

[73] Assignee: Fuji Photo Optical Co., Ltd., Omiya, Japan

[21] Appl. No.: 879,917

[22] Filed: May 8, 1992

[30] Foreign Application Priority Data

May 10, 1991 [JP] Japan ............................. 3-133402
Jan. 24, 1992 [JP] Japan ............................. 4-032966

[51] Int. Cl.⁵ .................... G03B 17/02; G03B 17/50; G03B 29/00
[52] U.S. Cl. .................................... 354/82; 354/288; 294/139
[58] Field of Search ............... 354/81, 82, 288, 293; 74/551.9; 294/139; 352/243; 358/229; D16/219, 243

[56] References Cited

U.S. PATENT DOCUMENTS 4,757,335 7/1988 Muryoi et al. ................. 354/82
4,959,729 9/1990 Fukuda et al. ................. 358/229

FOREIGN PATENT DOCUMENTS 61-63828 4/1986 Japan ................. 294/139
63-106276 7/1988 Japan .
2-56536 2/1990 Japan ................. 294/139

Primary Examiner—Michael L. Gellner
Assistant Examiner—J. K. Han
Attorney, Agent, or Firm—Oblon, Spivak, McClelland, Maier & Neustadt

[57] ABSTRACT

A lens grip for a shoulder type camera, the lens grip having a housing which includes a fixed base member to be fixedly attached to a lens assembly of the camera and a cover member to be adjustably fixed to the base member, wherein the lens grip housing accomodates therein drive members including a lens drive motor and lens position sensor mechanisms therefor, operating members for controlling operations of the drive members, and an electric circuit board connected between the drive and operating members through wiring cables. In order to permit angular adjustments of the cover member on the base member of the housing, the cover and base members each are provided with a joint portion formed in a circular shape at least in part thereof, and are joined together through a coupling mechanism located at the center of the circular joint portions and, moreover, are arranged to permit angular adjustments of the cover member relative to the base member. A positioning mechanism is provided between the joint portions of the two housing members to fix the cover member in a desired angular position relative to the base member.

5 Claims, 9 Drawing Sheets

LENS GRIP COUPLING AND POSITIONING MECHANISM

BACKGROUND OF THE INVENTION

1. Field of the Invention

This invention relates to a lens grip to be attached on a lens assembly, for example, of a shoulder type television camera or a video camera which is supported on the shoulder of a cameraman in outdoor shooting or in similar situations, so that the cameraman can operate the camera lenses with one or more fingers while holding the video camera through the lens grip.

2. Description of the Prior Art

In the shoulder type video camera, which is composed of a camera body and a lens assembly, the lens grip which is attached to the lens assembly has not only the function of stabilizing the camera on the shoulder but also the function of operating the camera lens together with one or more fingers of the hand which holds the lens grip. For these purposes, the lens grip is usually adapted to be detachably fixed on a lens barrel by screws or other suitable fixation means, and provided with a housing which is formed in a grip-shape on the outer side and which is arranged to accommodate lens drive means for zooming and focusing lenses, along with an iris drive motor and potentiometers for detection of lens and iris positions.

These component parts are mounted in position within the housing as drive members, in association with operating members including a switch and a push button for controlling the operations of the drive motor and other drive members, and an electric circuit board which interconnects the operating and drive members through corresponding electric control circuits. Various switches of the operating members are assembled on a unitary structure to provide an operating unit assembly. When mounted in the housing, the switches of the operating unit are exposed to the outside through the wall of the housing, so that the cameraman can operate them with more fingers of the hand which is put on the lens grip.

The lens grip housing of this sort has a grip portion which is so shaped as to fit in the palm of the cameraman's gripping hand which is put on a predetermined position on the lens grip. In this connection, when a cameraman holds a lens grip of a video camera which is supported on the shoulder, the cameraman usually inclines the gripping hand slightly in the forward direction or toward the subject rather than keeping the hand at right angles with the axis of the camera, because this is easier for him or for her to hold the lens grip and to manipulate the operating means on the grip. Therefore, it is the general practice to form the lens grip housing in a shape which fits a hand in a forwardly inclined state.

Nevertheless, the optimum angle of inclination of the grip portion varies from one cameraman to another and also varies to some extent depending upon the personal traits of the individual cameraman. In addition, the optimum grip angle varies depending upon the direction of the subject. Namely, the optimum grip angle for a camera lens which is pointed at an elevated subject differs from the optimum grip angle for a camera lens which is pointed at a lowly located subject. Therefore, it has been known in the art to provide a lens grip which permits adjustments of the grip angle as disclosed, for example, in Japanese Laid-Open Utility Model Application 63-106276.

In this known lens grip, the housing is divided into two parts, i.e., a base member to be fixed on a lens assembly and a cover member to be adjustably joined with the base member. The above-mentioned driving components are mounted on the fixed member, while the operating unit assembly and electric circuit board are mounted on the cover member. The cover member is rotatably coupled with the fixed base member through a rotational shaft which is provided on a proximal end portion of the cover member, namely, in an upper corner portion of its proximal end on the side of the camera body. The angular position of the cover member is varied by turning the same relative to the base member about the rotational shaft. The lens grip housing is provided with a lock pin in order to fix the cover member in an adjusted angular position on the base member. After a grip angle adjustment in released state, the cover member is fixed and connected to the base member by the lock pin.

The above-described prior art lens grip, which employs a lock pin to hold together the base and cover members in coupled state, has a drawback in that the rotational shaft and locking pin are subjected to unduly great loads through the cover member which is gripped by the cameraman, and thus suffer from deformations and damage in many cases. Besides, since the center of rotation is located in a corner portion of the cover member, the diagonally opposite corner portion of the cover member is largely deviated from a normal position on the base member as the cover member is turned about the rotational shaft, giving a considerably degraded look to the grip by disturbing its profile. At the same time, the center position of the cover member is shifted upward or downward by an angular adjustment, making it difficult for the cameraman to hold the grip in a stable state or causing considerable fatigue to the cameraman in lengthy video-shooting.

SUMMARY OF THE INVENTION

The present invention contemplates eliminating the above-mentioned drawbacks or problems of the prior art lens grip, and has as its object the provision of a lens grip which permits adjustments of the lens grip angle while ensuring a stable grip on a lens assembly and easy manipulation of operating means on the lens grip and without disturbing the profile of the lens grip.

In accordance with the present invention, the above-stated objective is achieved by the provision of a lens grip for a shoulder type camera, the lens grip having a housing composed of a fixed base member to be fixedly attached to a lens assembly of the camera and a cover member to be adjustably fixed to the base member, the lens grip housing accommodating therein drive members including lens drive motor and a lens position sensor mechanisms therefor, operating members for controlling operations of the drive members, and an electric circuit board connected between the drive and operating members through wiring cables, characterized in that the lens grip housing comprises: cover and base members each provided with a joint portion formed in a circular shape at least in part thereof; a coupling mechanism located at the center of the circular joint portions and adapted to couple the cover member with the base member in such a manner as to permit angular adjustments of the cover member relative to the base member; and a positioning mechanism provided between the joint portions of the two housing members to fix the cover member in a desired angular position relative to the base member.

The above and other objects, features and advantages of the invention will become apparent from the following description and the appended claims, taken in conjunction with preferred embodiments shown in the accompanying drawings. Needless to say, the drawings show preferred embodiments of the invention by way of example, and should not be construed as limitative of the invention.

DESCRIPTION OF THE PREFERRED EMBODIMENTS

Hereafter, the invention is described more particularly by way of the preferred embodiments shown in the drawings.

Figure 1:
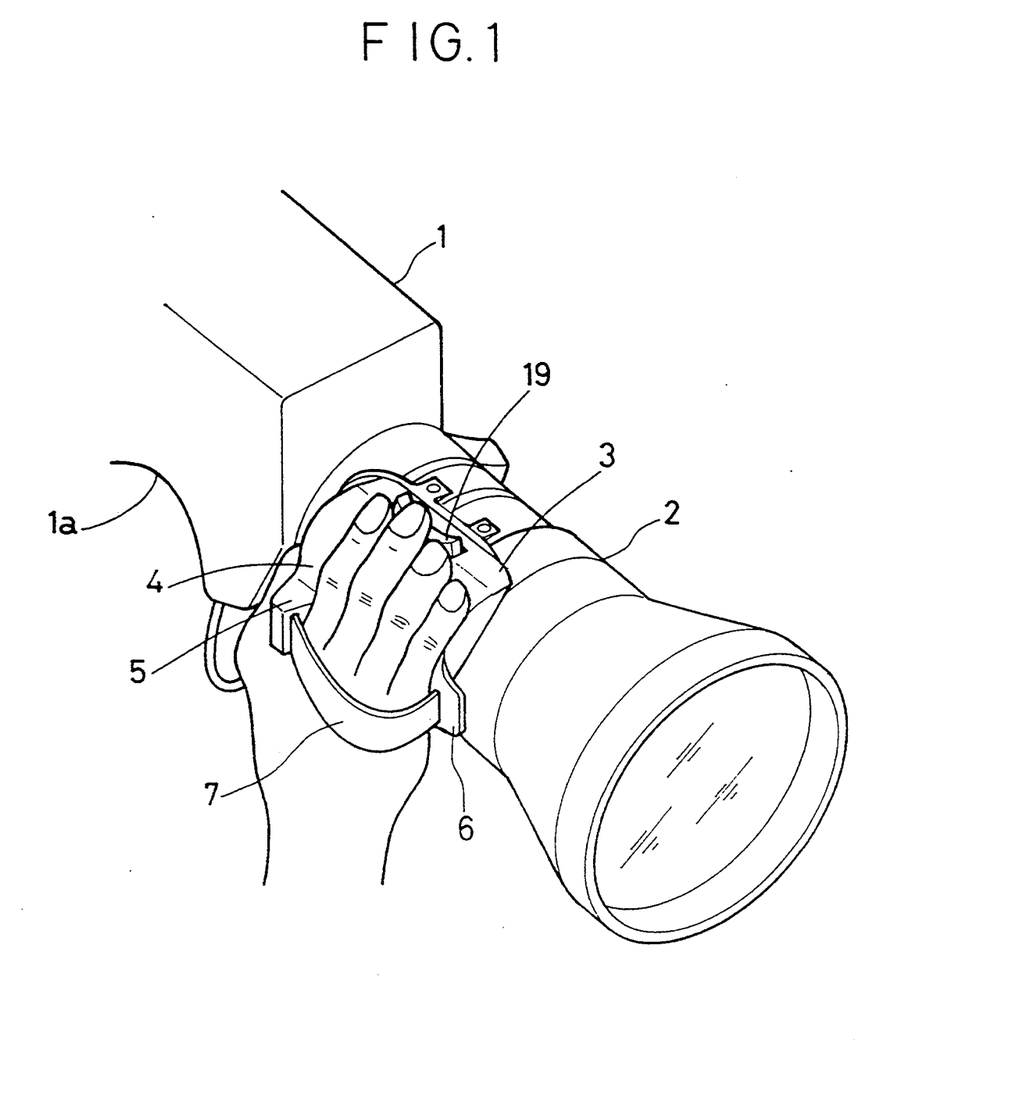
FIG. 1 is a schematic perspective view of a video camera with a lens grip.
Figure 2:
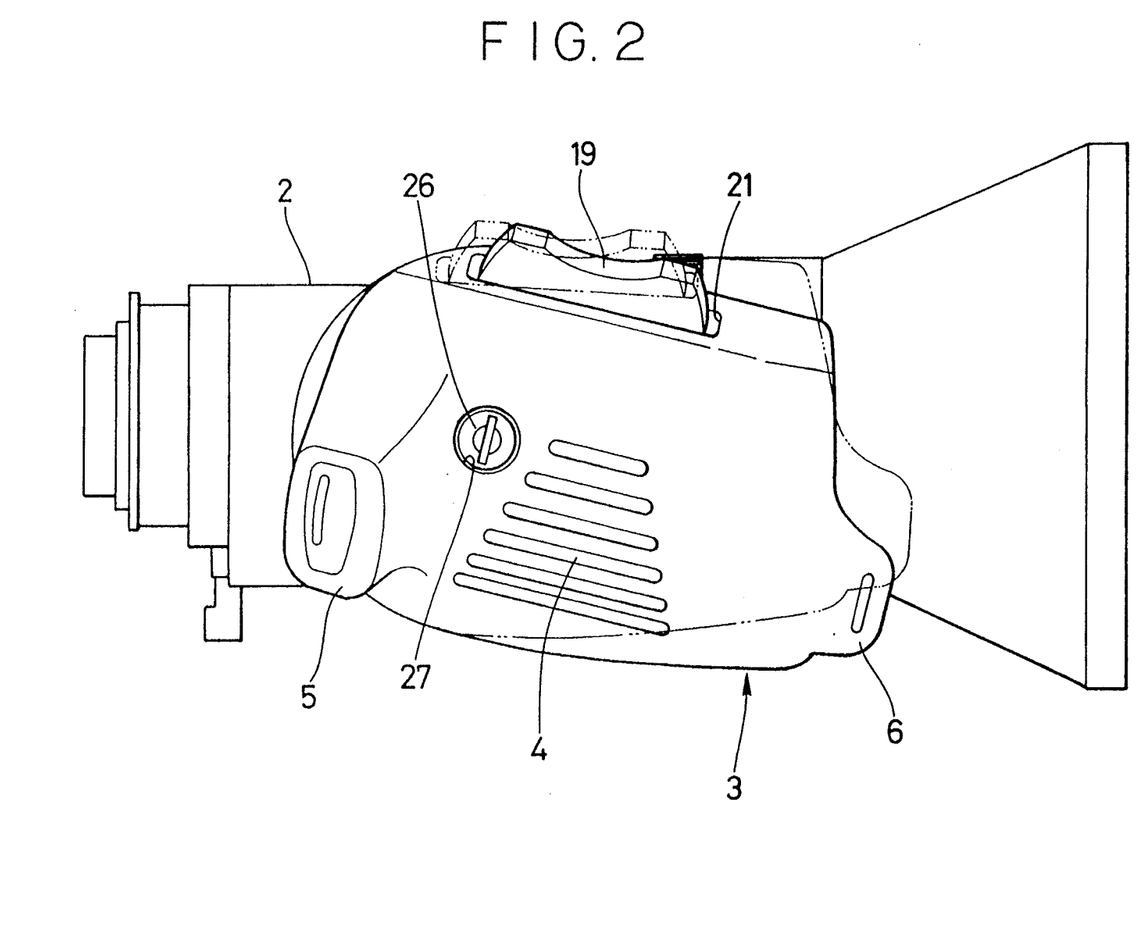
FIG. 2 is a side view of a lens assembly equipped with a lens grip according to the present invention.

Referring first to FIGS. 1 through 6, there is shown a lens grip embodying the present invention. FIG. 1 is a general outer view of a shoulder type television or video camera, while FIG. 2 is an outer view of the lens grip with a hand holder strap or belt removed therefrom. As seen in these figures, the video camera has a lens assembly 2 detachably mounted on the front side of a camera body 1 with a base which is provided with an arcuate recess 1a on its lower side to be put on the shoulder of the cameraman. The lens assembly 2 has the lens grip 3 detachably attached thereto. Therefore, when the arcuately recessed base 1a of the camera is put on a cameraman's shoulder for a video shooting or for carrying the camera, the cameraman can maintain the camera in a stable state by holding the lens grip 3.

In this connection, in addition to the function of supporting the video camera in a stable state, the lens grip 3 functions as operating means for the camera lens 2. For ensuring the camera supporting function, the lens grip 3, which will be described hereinafter, is provided with a grip portion 4 on an outer cover member 11 to be engaged with the palm of the cameraman's gripping hand, along with a projection 5 which is located closer to the proximal end of the cover member 11 for engagement inbetween the thumb and forefinger of the gripping hand. To hold the back of the cameraman's gripping hand, a belt 7 is passed between the projection 5 and a belt stopper 6 at the fore end of the cover member 11.

Figure 3:
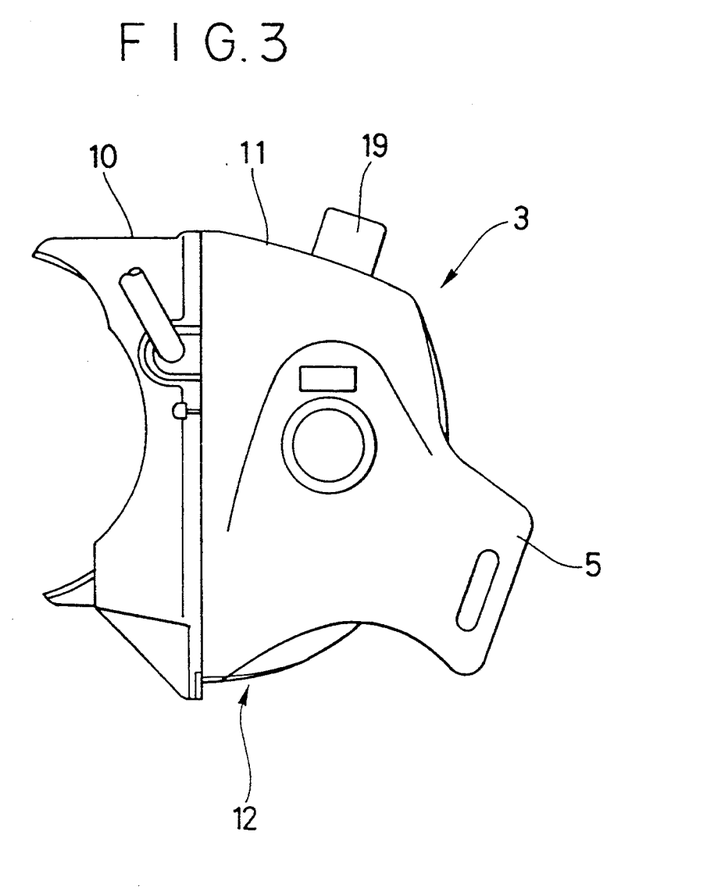
FIG. 3 is a rear end view of the lens grip.
Figure 4:
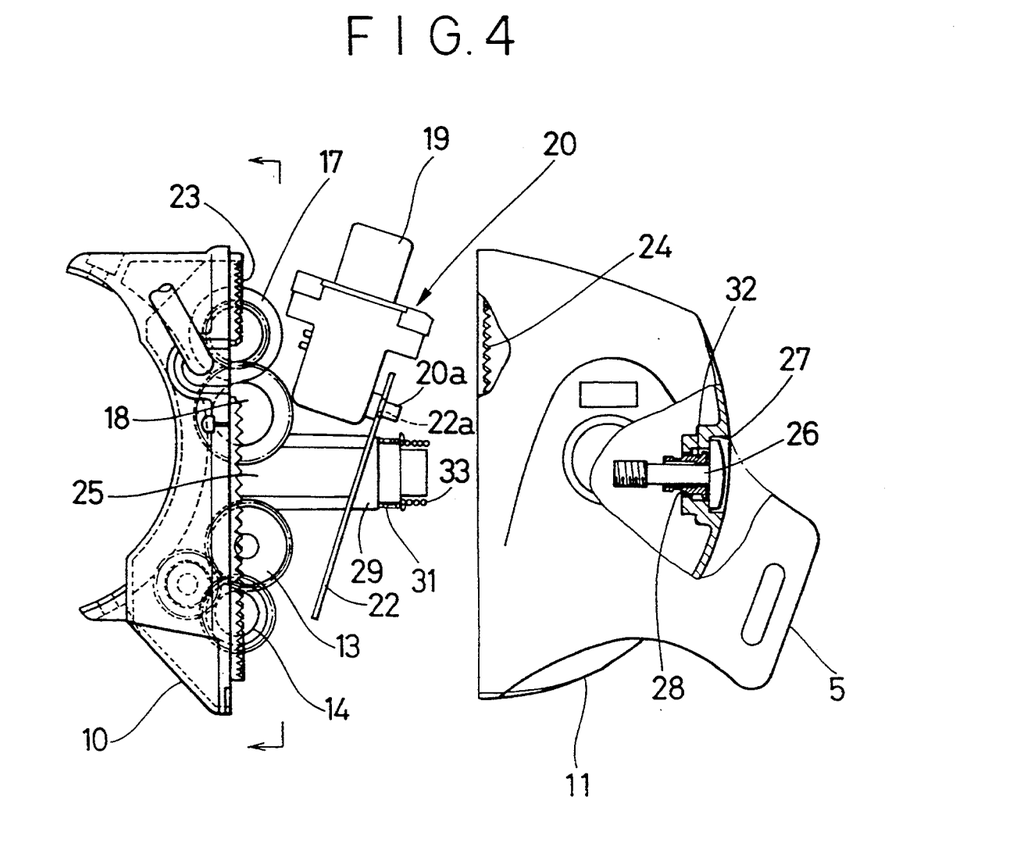
FIG. 4 is a rear end view of the lens grip of FIG. 2, with a cover member of the lens grip detached from a base member.
Figure 5:
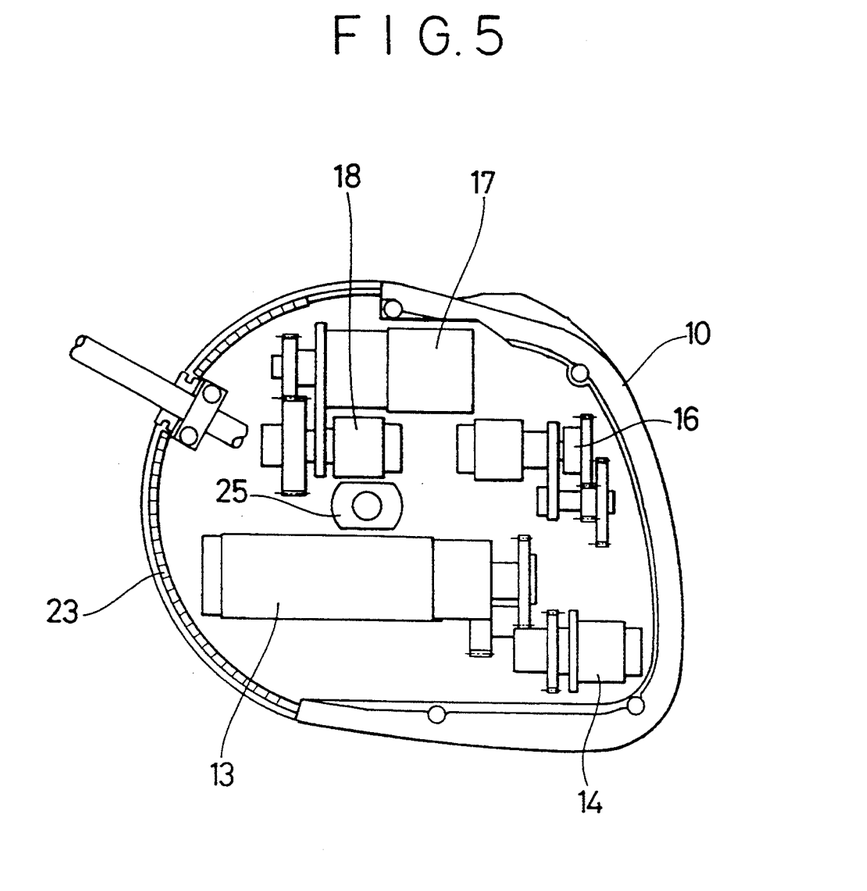
FIG. 5 is a schematic view of the lens grip, taken in the arrowed direction in FIG. 4.

Referring to FIGS. 3 to 5, the operating means for the camera lens 2 has the following functions. As seen in these figures, the housing 12 of the lens grip 3 is composed of a base member 10 and cover member 11 which are separably coupled with each other. The base member 10 is detachably fixed to the camera lens 2 by means of setting screws or other suitable fixation means, and, as shown particularly in FIGS. 4 and 5, supports therein lens and iris drive members and associated parts, including a zoom lens drive motor 13, a potentiometer 14 for detection of the zoom lens position, a potentiometer 16 for detection of the focusing lens position, an iris drive motor 17, and a potentiometer 18 for detection of the iris position. On the other hand, mounted in an upper portion of the cover member 11 is an operating unit assembly 20 which has various operating members assembled on a unitary structure, including a see-saw switch 19 which is exposed to the outside through an aperture 21 in an upper portion of the cover member 11 along with other switches or push buttons (not shown) to be manipulated by the cameraman for operating the camera lens and iris. The operating unit assembly 20 is connected to the zoom drive motor 13 and iris drive motor 17 through an operation control mechanism which is mounted on the electric circuit board 22. Therefore, the operating unit assembly 20 is connected through a wiring cable to the electric circuit board 22, which is in turn connected to the zoom drive motor 13, zoom potentiometer 14, focus potentiometer 16, iris drive motor 17 and iris potentiometer 18 through the respective wiring cables.

Figure 6:
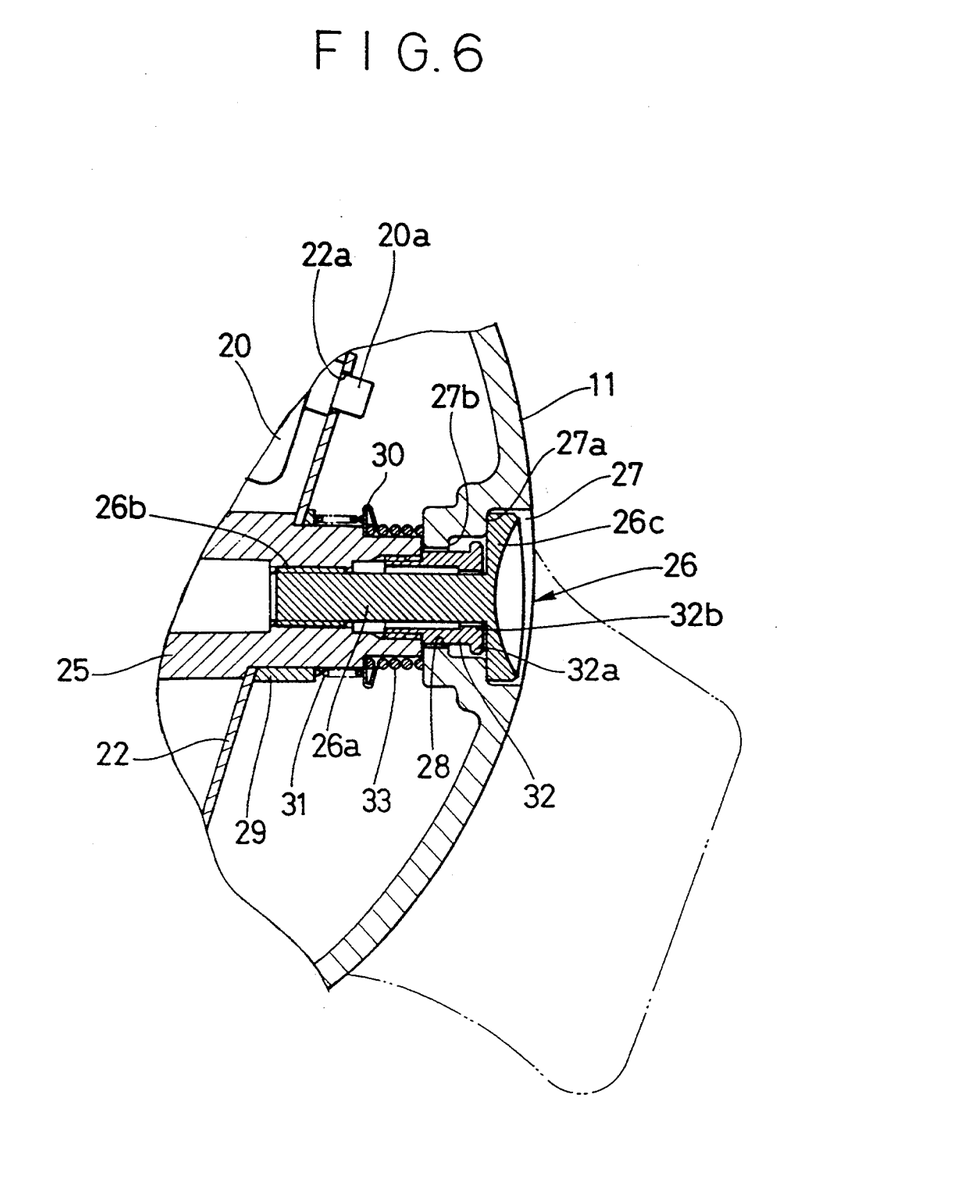
FIG. 6 is a fragmentary sectional view of a coupling mechanism provided between the base and cover members.

The cover member 11 is fixable in an adjusted angular position relative to the base member 10 when coupled with the latter. For this purpose, proximal end portions of the base and cover members 10 and 11, on the side of the camera body 1, are each formed in an arcuate shape through an angle of about 180°, and are provided with positioning teeth 23 and 24 on the respective joint faces of the arcuate portions with a predetermined margin for displacement in each way. These positioning teeth 23 and 24 are formed in a pitch of about 3°, so that the cover member 11 can be turned relative to the base member 10 stepwise at angular intervals corresponding to the abovementioned positioning tooth pitch (approximately at angular intervals of 3°) within the angular range of the aforementioned margins, namely, between the positions indicated by solid and imaginary lines in FIG. 2, and fixed in a desired angular position relative to the base member 10 with the positioning teeth 23 and 24 in a meshed state. A connector rod 25 of the coupling mechanism is erected on the base member 10 at the center of the arcuately shaped proximal end portion. A connector bolt 26 is threaded into the connector rod 25 on the base member 10 through an aperture 28 in the cover member 11 to hold the two members securely in coupled state. As shown in FIG. 6, the head of the connector bolt 26 is fitted in a circular stepped recess 27 which is formed around the aperture 28 substantially at the center of the cover member 11. Since the aperture 28 is so dimensioned as to permit passage of a shank portion 26a and a male screw 26b formed in a fore end portion of the shank 26a, the head of the connector bolt 26 is abutted against a stepped wall 27a of the circular recess 27. The connector rod 25 is internally tapped with a female screw 25a for threaded engagement with the male screw 26b on the connector bolt 26. Accordingly, by threading the connector bolt 26 into the connector rod 25, the cover member 11 is fixedly coupled with the base member 10 with its positioning teeth 24 in meshed engagement with the opposing teeth 23 on the base member 10.

In this instance, the electric circuit board 22, which is connected between the operating members and the drive members through wiring cables, is mounted in an inclined state on the connector rod 25 at a certain predetermined angle toward the cover member 11, and arranged to turn about the connector rod 25 when the cover member 11 is turned relative to the base member 10 for adjustment of the grip angle. For this purpose, the operating unit assembly 20 which is mounted on the cover member 11 is provided with an interlocking pin 20a which is loosely received in a interlocking hole 22a in the electric circuit board 22. In order to support the electric circuit board 22 rotatably relative to the connector rod 25 and to prevent its dislocation from its position on the connector rod 25, an adaptor ring 29 is fitted on the connector rod 25 on the outer side of the electric circuit board 22, the adaptor ring 29 having an inclined inner end which is inclined complimentarily at the same angle of inclination as the electric circuit board 22, and a straight outer end which is disposed at right angles with the connector rod 25. A compression spring 31 is fitted between the adaptor ring 29 and a spring seat 30, thereby pressing the adaptor ring 29 constantly against the electric circuit board 22.

With the above arrangements, the cover member 11 can be released from the base member 10 upon loosening the connector bolt 26 out of the connector rod 25 to an extent which is sufficient for disengaging the positioning teeth 23 and 24 from each other. In this released state, the cover 11 can be turned about the connector bolt 26 through a predetermined angle for adjustment of the grip angle. The cover member 11 which has been brought to a desired angular position can be securely coupled with the base member 10 again by threading the connector bolt 26 into the connector rod 25 until the positioning teeth 23 and 24 are meshed with each other. When loosening the connector bolt 26, there are possibilities of breaking the wiring cables to the electric circuit board 22 if the cover member 11 is completely detached from the base member 10. Therefore, in the released or uncoupled state, movement of the cover member 11 is restricted to a range which is only slightly greater than the height of the positioning teeth 23 and 24.

More specifically, for this purpose, a cylindrical stopper member 32 is threaded on the connector rod 25, the stopper member 32 being provided with an annular flange 32a at its outer end which is projected outward through the aperture 28 in the cover member 11. The annular flange 32a is received in a stopper receptacle 27b in a deeper portion of the stepped recess 27 and arranged to be abutted against the edge portion of the stopper receptacle 27b to restrain the cover member 11 from a movement which would cause complete disengagement from the base member 10. Accordingly, the annular flange 32a of the stopper member 32 is spaced from the bottom wall of the stopper receptacle 27b by a distance which is slightly greater than the height of the positioning teeth 23 and 24. The connector bolt 26 receives the stopper member 32 through an inwardly stepped wall 32b with an inner diameter which is slightly larger than the shank portion 26a of the connector bolt 26 but slightly smaller than the outer diameter of the male screw portion 26b. In FIG. 5, reference numeral 33 denotes a spring which biases the cover member 11 in a direction away from the base member 10, so that the cover member 11 is automatically separated from the base member 10 by the biasing action of the spring 33 upon loosening the connector bolt 26.

In this embodiment, as the connector bolt 26 is threaded into the connector rod 25, the head 26c of the bolt 26 is pressed against the wall 27a of the recess 27 on the cover member 11 to clamp the same securely against the base member 10. In this state, the positioning teeth 23 and 24 on the arcuate portions of the base and cover member 10 and 11 are meshed with each other to fix the cover member 11 securely in a selected angular position relative to the base member 10. Therefore, with a greater number of the positioning teeth 23 and 24 of a sufficient height, the joint portions of the two members 10 and 11 can be connected to each other more firmly and stably to prevent imposition of unduly great loads on the connector bolt 26.

In case it is desired to vary the grip angle upward or downward to suit the traits of a cameraman or a particular shooting condition, the connector bolt 26 is unscrewed out of the connector rod 25. By so doing, the cover member 11 is released and spaced from the base member 10 by a predetermined distance under the influence of the biasing action of the spring 33, disengaging the positioning teeth 23 and 24 from each other. Consequently, the cover member 11 can be turned about the connector bolt 26 into a desired angular position relative to the base member 10. By threading the connector bolt 26 again into the connector rod 25, the cover member 11 is fastened in that position to the base member 10 on the camera lens with the respective positioning teeth 23 and 24 in meshed state. Besides, fine adjustments of the grip angle are possible since the positioning teeth 23 and 24 are large enough for providing in a fine pitch the positioning teeth 23 and 24 with sufficient strength.

In this connection, each of the base and cover members 10 and 11 is formed in an arcuate shape through an angle of about 180° in the proximal end portion on the side of the camera body 1 as described hereinbefore, so that the angular adjustment of the cover member 11 can be made without entailing positional deviations of these portions which would lead to disturbances in profile. In case the opposite end portions on the side of the subject are also formed in an arcuate shape in profile, it becomes possible to suppress to a minimum such disturbances in outer configuration of the two coupled members 10 and 11, permitting to make angular adjustments of the cover member 11 without degrading the appearance of the lens grip. As seen in FIG. 2, the connector bolt 26 is located substantially at the center of the grip portion 4, so that the above-mentioned angular adjustment can be made almost without causing a shift in position of the grip portion 4 to be held in the palm of the cameraman's hand, particularly in height relative to the lens assembly 2 to ensure a stable grip on the grip portion 4 as well as less fatigable operations for an extended time length.

The electric circuit board 22, which is mounted on the connector rod 25 on the base member 10, facilitates the job of connecting wiring cables to various drive members on the base member 10 and to the operating unit assembly 20. Further, if desired, the cover member 11 can be detached from the base member 10 by inserting a suitable jig into a gap space which is formed between the head 26c of the connector bolt 26 and the stopper receptacle 27b after unscrewing the connector bolt 26 to a position where its male screw portion 26c is abutted against the stepped portion 32b of the stopper member 32. Consequently, the operating unit assembly 20 can be removed from the cover 11 or the electric circuit board 22 can be dismantled from the connector rod 25, if necessary for facilitating repair or maintenance jobs or for other purposes.

In this embodiment, the electric circuit board 22 is mounted in an inclined state on the connector rod 25 in consideration of the size of the electric circuit board 22 and the available space in the housing 12. However, the electric circuit board 22 is not necessarily required to be mounted in an inclined state in case it is of a smaller size. Further, the electric circuit board 22 may be fixed on the connector rod 25 if it is small enough to keep it out of contact with the inner surface of the cover member 11 when the latter is turned. In the foregoing embodiment, the positioning teeth 23 and 24 are formed on the arcuate portions of the base and cover members 10 and 11, respectively, along an arc of approximately 180°. In this regard, the greater the angle of the toothed arc, the more secure becomes the engagement between the base and cover members 10 and 11. In case they are formed completely in a circular shape, there will occur no positional deviations of one member from the other. Further, instead of the threaded coupling, the connector rod and bolt may be connected with each other, for example, through a bayonet coupling.

Figure 7:
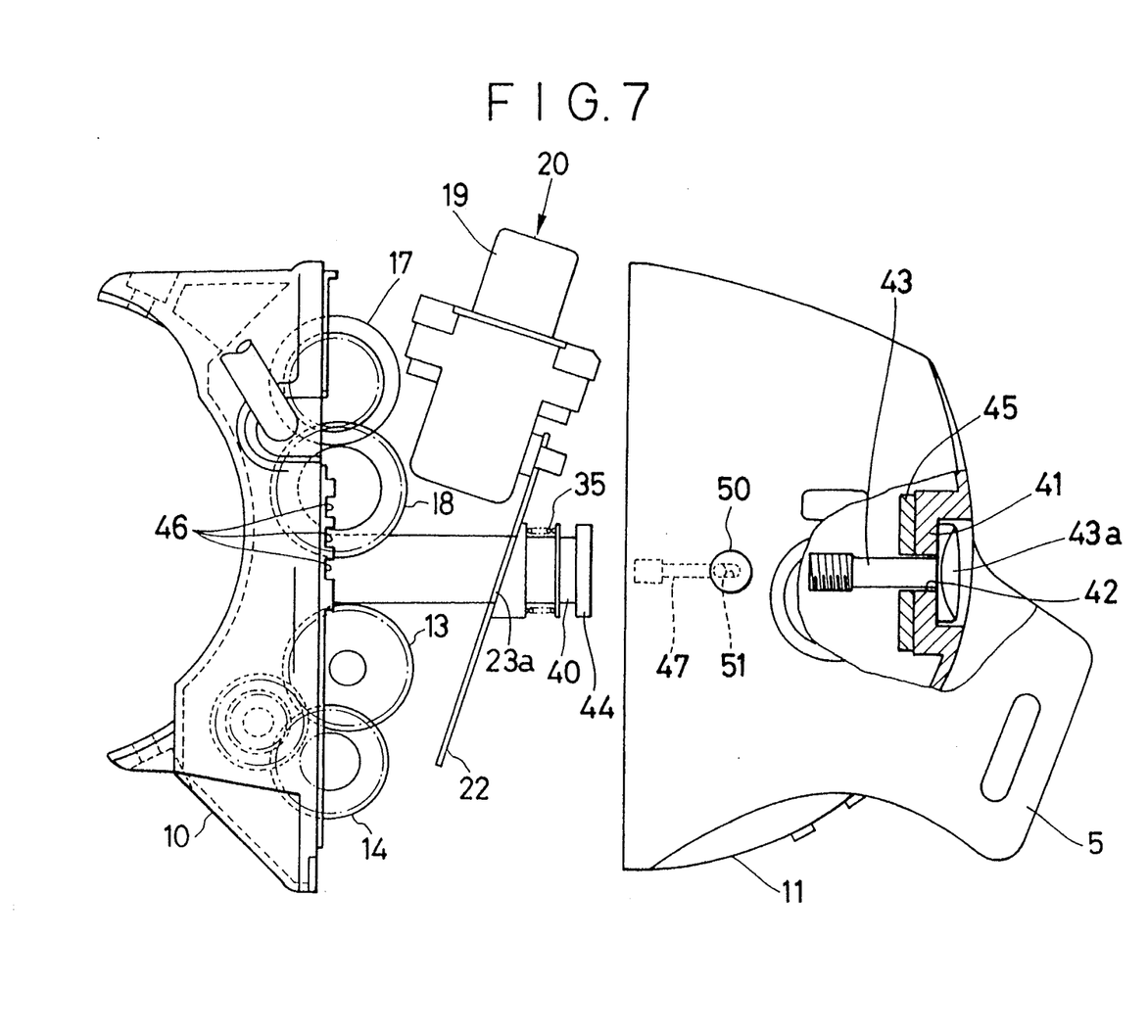
FIG. 7 is a partly cutaway end view of a lens grip in another embodiment of the present invention, with the cover member detached from the base member.
Figure 8:
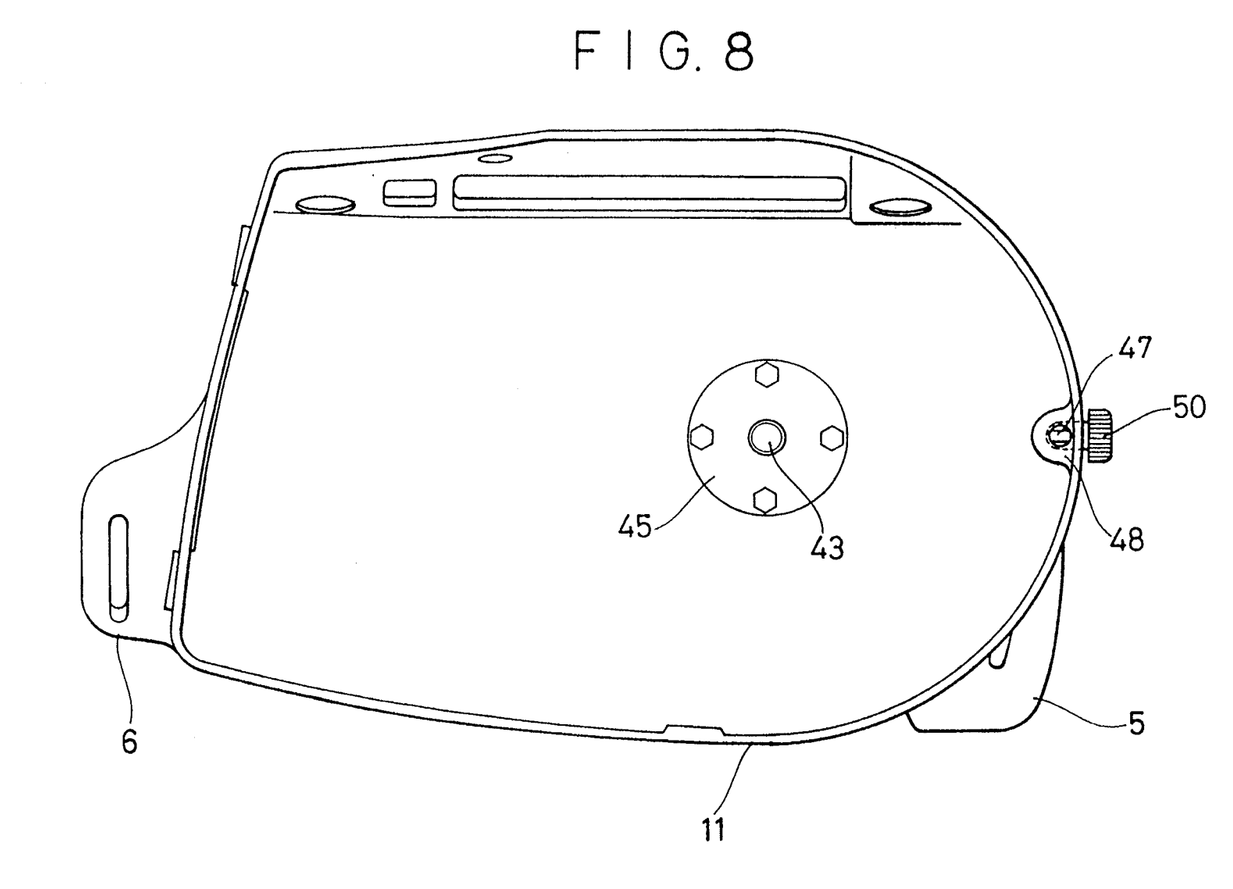
FIG. 8 is an inner side view of the cover member, showing a positioning mechanism on the cover.
Figure 9:
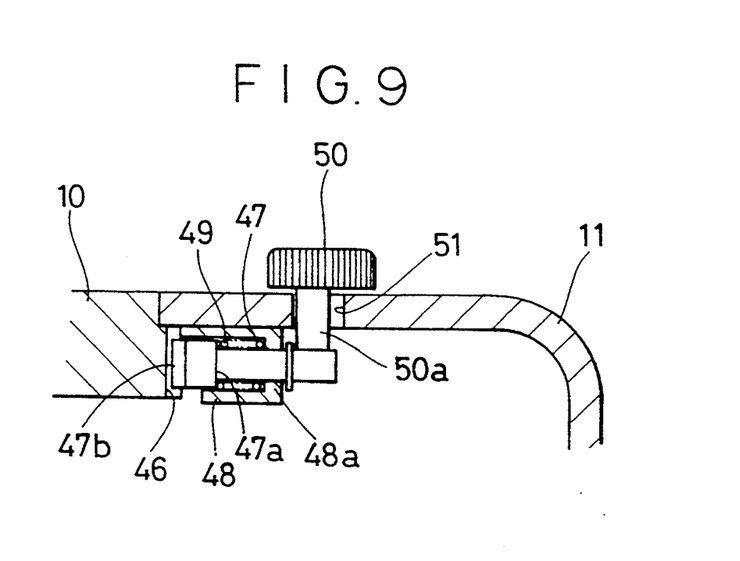
FIG. 9 is a sectional view of the positioning mechanism.

Referring to FIGS. 7 to 9, there is shown another embodiment of the invention, in which the component parts common or equivalent to the above-described first embodiment are designated by common reference numerals and their description is omitted to avoid repetitions.

As seen in FIG. 7, in this embodiment, the cover member 11 and base member 10 are coupled with each other through a coupling mechanism including, similarly to the above-described first embodiment, a connector rod 40 which is erected on the base member 10, and a recess 41 which is formed in the wall of the cover member 11 and provided with an aperture 42 in the bottom wall thereof for receiving a connector bolt 43 to be threaded into the connector rod 40. In this embodiment, the coupling mechanism is reinforced by engagement of a friction plate 44, which is provided at the outer end of the connector rod 40, with a friction plate 45 which is fixed on the inner surface of the bottom wall of the recess 41. More specifically, in this case the friction plates 44 and 45 produce a frictional coupling force as they are pressed against each other upon tightening the connector bolt 43. In this instance, the greater the clamping force of the connector bolt 43, the greater becomes their frictional coupling force. However, for the purpose of adjusting the angular position of the lens grip by turning the cover member 11 relative to the base member 10 without loosening the connector bolt 43 as will be described hereinlater, the clamping force of the connector bolt 43 is preferred to be adjusted to a magnitude which is great enough to maintain the frictional coupling against external forces as casually imposed on the cover member 11 in ordinary video-shooting operations but which would yield to a greater external force as applied to the cover 11 to turn same forcibly.

In this embodiment, the positioning mechanism is provided on the proximal end portions of the base and cover members 10 and 11 on the side of the camera body 1, which are each formed in the shape of an arc over a predetermined angular range, the arc having its center at the connector bolt 43 as in the foregoing embodiment. The positioning mechanism includes a plural number of square grooves 46 formed on the arc on the part of the base member 10, and a retractable pin 47 which is provided on the part of the cover member 11 and adapted to engage selectively in one of the square grooves 46 on the base member 10. In order to bring the pin 47 into and out of engagement with a square groove 46 without loosening the connector bolt 43, the pin 47 is slidably fitted in a bush 48 which is fixedly provided on the inner wall surface of the cover member 11 as shown in FIG. 9. In a normal state, a chamfered locking head 47b which is provided at the fore end of the pin 47 is urged to engage in one of the square grooves 46 by a spring 49 which is positioned between a stepped portion 47a on the pin 47 and the bush 48. When the pin 47 is slid against the biasing action of the spring 49, the locking head 47b is disengaged from the square groove 46. Shaft 50a of a pin retracting knob 50 is connected to the pin 47 to permit the operator to slide the pin 47 manually out of engagement with the square groove 46. This pin retracting knob 50 is located on the outer side of a side wall portion of the cover member 11, and its shaft is received in a slot 51 which permits its displacement in the longitudinal direction of the pin 47. Accordingly, by pushing the retracting knob 50 with a finger, the pin 47 can be displaced against the biasing action of the spring 49 to retract the locking head 47b of the pin 47 away from the square groove 46.

With this arrangement, upon threading the connector bolt 43 into the connector rod 40, the head 43a of the bolt 43 is pressed against the bottom wall of the recess 41, pushing the friction plate 45 on the cover member 11 against the friction plate 44 on the connector rod 40. At the same time, the pin 47 is held in engagement with a selected one of the square grooves 46 by the action of the spring 49. As a consequence, the cover member 11 is fixed to the base member 10 securely and stably in such a manner as to preclude its detachment from the base member 10 as well as its positional deviations even if external forces are applied thereto when the cameraman passes a hand under the strap 7 or operates the camera lens 2. Besides, the external forces imposed on the cover member 11 are supported by the frictional coupling force between the friction plates 44 and 45, thereby keeping the connector bolt 43 and the pin 47 free of unduly large loads and deformations or damages.

In order to change the angular position of the cover member 11 upward or downward, firstly the pin 47 is disengaged from the square groove 46 by manipulating the retracting knob 50. In this state, the cover member 11 is turned about the connector bolt 43 forcibly with a force which is greater than normal lens operating forces. By so doing, the friction plate 44 is slid relative to the other friction plate 45, changing the angular position of the cover member 11. The retracting knob 50 is released as soon as the cover member 11 reaches a desired angular position, whereupon the pin 47 is brought into engagement with an opposing square groove 46 to fix the cover member 11 in that position. Thus, there is no need for loosening the connector bolt 43 at the time of adjusting the angular position of the cover member 11, and the adjustment can be made in an extremely facilitated manner without using any tool. After an adjustment of the angular position, the cover member 11 is retained in position in an extremely secure and stable state relative to the base member 10 thanks to the engagement of the pin 47 in the square groove 46 and the frictional coupling force of the friction plates 44 and 45.

Figure 10:
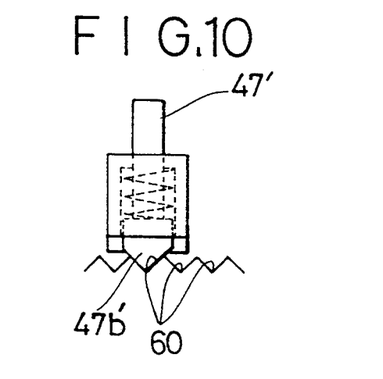
FIGS. 10 and 11 are schematic views of modifications of the positioning mechanism, employing a pin member and a stopper.
Figure 11:
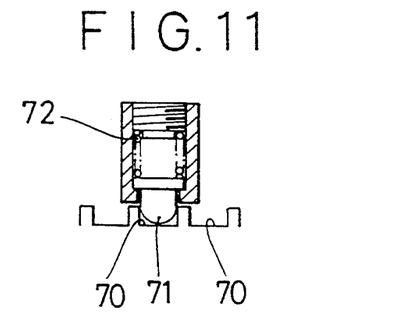

Shown in FIG. 10 is a modification of the positioning mechanism, employing a pin 47' with a V-shaped locking head 47b' in combination with V-shaped positioning grooves 60, in place of the above-described combination of a pin with a chamfered locking head and square positioning grooves. In another modification shown in FIG. 11, a click member 71 is biased by a spring 72 to engage with one of a plurality of positioning grooves 70. In this case, the adjustment of the angular position of the cover member 11 can be made in a more convenient manner, because what is required here is merely to turn the cover member 11 with a force which overcomes the frictional coupling force of the friction plates 44 and 45 plus the force of the click spring 72 acting on the click member 71.

What is claimed is:

1. A lens grip for a shoulder camera, which comprises:
    a housing which includes a fixed base member for being fixedly attached to a lens assembly of said camera and a cover member adjustably coupled with said base member, said cover and base members each including joining portions formed with at least a partially circular shape, and a plurality of drive members located in said housing, said drive members including a lens drive motor and a lens position sensor mechanism,
    a plurality of operating members connected to said drive members for controlling operation of said drive members, and
    an electric circuit board connected between said drive members and operating members through wiring cables,
    a coupling mechanism located at a substantially center portion of circular sections of each said joining portions for coupling said base and cover members with each other in such a manner as to permit angular adjustments of said cover member relative to said base member; and
    a positioning mechanism provided in proximity with said joining portions of said base and cover members for fixing said cover member in a desired angular position relative to said base member wherein said coupling mechanism comprises a connector rod positioned on said base member and a connector bolt threaded into said connector rod through said cover member and wherein said positioning mechanism comprises rows of positioning teeth formed on joining faces of said partially circularly shaped portions of said base and cover members for meshing engagement with each other.

2. A lens grip as defined in claim 1, wherein said coupling mechanism is located substantially at a center portion of said cover member and at a median point between upper and lower sides of said camera lens.

3. A lens grip as defined in claim 1, which comprises a stopper member provided between said cover member and said connector rod for restraining said cover member from moving away from said base member beyond a predetermined distance.

4. A lens grip as defined in claim 1, wherein said operating members are mounted in said cover member, said drive members are fixedly mounted on said base member, and said electric circuit board is mounted on said connector rod.

5. A lens grip as defined in claim 4, wherein said electric circuit board is rotatable about said connector rod together with said base member.

* * * * *